Figure 1:
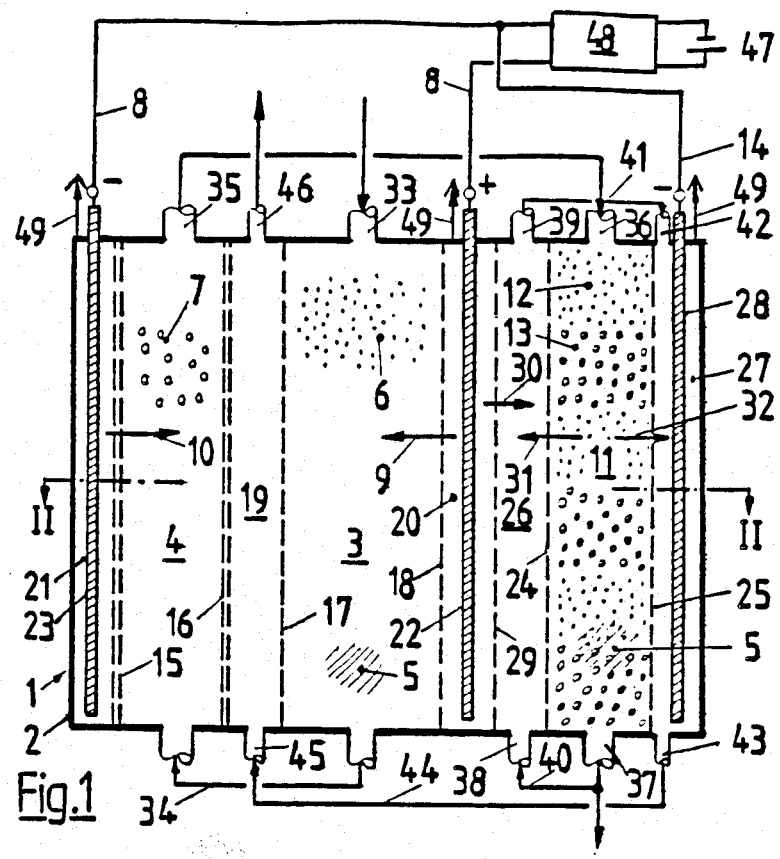

United States Patent [19]

Kunz

[11] Patent Number: 4,636,296

[45] Date of Patent: Jan. 13, 1987

[54] PROCESS AND APPARATUS FOR TREATMENT OF FLUIDS, PARTICULARLY DESALINIZATION OF AQUEOUS SOLUTIONS

[76] Inventor: Gerhard Kunz, Ruhrstrasse 111, D-5628 Heiligenhaus, Fed. Rep. of Germany

[21] Appl. No.: 693,948

[22] Filed: Jan. 23, 1985

[51] Int. Cl.[4] .............................................. B01D 13/02
[52] U.S. Cl. .................................. 204/182.5; 204/301
[58] Field of Search .............................. 204/182.5, 301

[56] References Cited

U.S. PATENT DOCUMENTS

| 3,645,884 | 2/1972 | Gilliland | 204/301 |
| 3,677,923 | 7/1972 | Bier | 204/301 |
| 3,686,089 | 8/1979 | Korngold et al. | 204/180 P |
| 3,704,218 | 11/1972 | Kato et al. | 204/301 |
| 4,111,780 | 9/1978 | Marayama et al. | 204/182.5 |
| 4,115,225 | 9/1978 | Carsi | 204/182.5 |
| 4,141,825 | 2/1979 | Conger | 204/182.5 |
| 4,148,708 | 4/1979 | Grant | 204/301 |
| 4,160,713 | 7/1979 | Matzuzaki et al. | 204/301 |
| 4,284,492 | 8/1981 | Karn | 204/301 |
| 4,295,950 | 10/1981 | Cole | 204/301 |
| 4,465,573 | 8/1984 | O'Hare | 204/182.5 |

Primary Examiner—Arthur P. Demers
Attorney, Agent, or Firm—Fleit, Jacobson, Cohn & Price

[57] ABSTRACT

The invention refers to a process and a device for the performance of a process for the treatment of liquids, particularly for the demineralization of aqueous solutions, whereby the liquid being treated is conducted through successive chambers of treatment, wherein in a first stage of the treatment demineralization takes place by means of ion displacement and in a second stage of post-treatment by means of ion desorption the salts that are removed from the treated liquids are led into so-called brine chambers, and are washed out of these chambers into a channel or other receiver by means of a transporting liquid.

46 Claims, 2 Drawing Figures

PROCESS AND APPARATUS FOR TREATMENT OF FLUIDS, PARTICULARLY DESALINIZATION OF AQUEOUS SOLUTIONS

The invention relates to a process and an apparatus for treatment of liquids, particularly demineralization of aqueous solutions, by which the solution and the ions dissolved in it are subjected in succession to different absorption and desorption procedures and thereafter the liquid is obtained as the treated product.

It is commonly known that liquids, particularly aqueous solutions, such as water of all kinds for industrial uses, have to be practically free of salts or their ionic dissociation components. To serve this purpose, various commonly known processes are used for the treatment of such liquids, whereby such dissolved salts are removed therefrom.

Furthermore, it is known that the soluble ion components of the soluble salts originating from a liquid and absorbed into an ion-exchange layer can be displaced by means of low currents coming from the electrode chambers. The electric resistance of the system caused by those displacing ion streams is kept low, and therefore the necessary changes in the electric potential even in cases of very high demineralization effects results in that only a small amount of residual salt concentration remains. But it has been proven that in cases of demineralization effects of such a kind the degree of current efficiency, i.e., means the transformation of electric equivalents into chemical ones, becomes constantly lower because a relatively high displacing ion current is needed for the displacement of even smaller quantities of ionic salt components.

Furthermore, processes are known, according to which the ionic components of the salts dissolved in a liquid are led directly to the electrodes after absorption in mixed ion-exchange resins by an electric field wherein a partial stream of the liquid being demineralized is used for rinsing the electrodes. The disadvantages of this procedure are, most of all, that volatile ion components, especially chlorides, are discharged at the anode, and extremely corrosive and toxic chlorine gas is liberated. There is even more chlorine liberated, as higher amounts of salts are removed.

Furthermore, it is known that the ionic components diffusing out of the mixed bed can be absorbed within additional exchange masses, being arranged between the mixed bed and the electrodes, and being diffused in parallel by rinsing streams. At the same time, the electrodes, i.e., the anodes and the cathodes, are washed by a third liquid stream originating from the same supply pipe. This requires that not only three waste water streams of a suitable quantity with the corresponding heat loss, must be taken into account, but that this large number of waste water streams must be arranged and adjusted to the whole mode of procedure.

A further disadvantage is that the migration of the ions away from the electrodes is hindered by the exchange masses being arranged between the mixed bed and the electrodes because these exchange masses function, with respect to the moving ions, as oppositely charged screening barriers. This has the effect of increasing the electrical resistance and consequently the consumption of electrical energy.

A further disadvantage of this known process of desorption is that the absorption layer of mixed anion- and cation-exchange masses has a high electric resistance because the path of each single sort of ions is constantly blocked by oppositely-charged ions, therefore blocking exchange sites during the desorption and movement of the ions in the electric field. All of the disadvantages of these processes become aggravated the higher the amounts of salt admitted which have to be removed.

It has now been discovered that the consumption of energy is at its lowest level when the demineralization process, working according to the displacement procedure, is applied to a liquid having a high salt content. In other words, the raw liquid, e.g., untreated water, is admitted, and the residual salt content remains relatively high. Therefore, only a partial demineralization is carried out. The procedures according to the present method of desorption, have shown that an optimal consumption of energy is achieved only when a simultaneous demineralization takes place down to a very low residual salt content. In other words, the quality of the product must be very good if the admission takes place with low salt concentration in the liquid being demineralized, and if an unblocked path is not available for the movement of each sort of ion.

Here the invention undertakes the task of demineralizing aqueous solutions without the use of regenerating chemicals, thereby reducing a high degree of salt content of a solution by means of ion displacement, and eliminating almost totally the remaining residual salt content by means of desorption (migration of ions) with unblocked absorption layers, and keeping down the energy consumption of both demineralization steps to an optimal low level. This is undertaken by using only a single waste water stream and coupling the two partial steps of the demineralization process by an arrangement of barrier layers, and absorption media as well as electrode chambers, thereby resulting in a total demineralization process of which the electric resistance, and thus also its total consumption of energy, is especially low. It is herein also provided a device for the practice of the process over a wide extent of variable through-puts, which is practicable and reliable in operation, and capable of maintaining a constant output flow over a long period of time.

According to the invention, this function is technically solved in that the fluid to be demineralized is submitted to a pre-treatment for a partial demineralization by means of ion displacement and to a post-treatment for a total demineralization by means of ion desorption. Both treatments are connected into one process.

Within the area of the process of absorption of the ionizable salt components dissolved in the liquid, different ions are produced in the electrode chambers separated from this liquid. These ions are each fused in a diagonal stream with the fluid passing through the respective absorption process. The diffusion or movement of the ion streams by means of absorption processes on the liquid are influenced by an electric field in the form of an electric potential. These ion streams pass, on their way to their respective process of absorption (displacement process), boundary layers, screening off this process and the ion-exchange masses contained therein from the respective electrode chambers, and cause within these masses an ion displacement such that they expel the ions from the respective process of absorption out of the liquid phase and the ion-exchange phase in a diagonal stream with the direction of the liquid stream, and into another boundary layer. Of these, one boundary layer separates the cation-absorption zone and the other boundary layer separates the anion-absorption zone, from the brine zone common to the processes of absorption. Such process consists of a cationand an anion-exchange phase. These ions migrating from the liquid phase and the ion-exchange phase penetrate the boundary layer which separates the respective brine zone from the respective process of absorption. However, after having reached the brine zone these ions are kept back in the brine zone by a boundary layer screening off the process of absorption from differently-charged ions, whereby the different ions produced in the electrode chambers and the diagonal streams formed by them are varied and limited by means of the electric potential. Only one portion of the ionizable salt components of the fluid being demineralized is removed into the brine zone.

The fluid which is to be further demineralized is led to a desorption zone in which it is again submitted to a special process of desorption. This desorption zone is comprised of alternating zones of layers of cation- and anion-exchange masses in which the residual components of the ionizable salts in the liquid being treated are absorbed. These are desorbed by means of an electric field in the form of a potential which is produced between the respective electrodes contained in the electrode chambers. The anode chamber with the respective anode used as one of the electrode chambers for the production of the displacement ion streams forms, together with the desorption zone, a brine zone. This anode chamber is separated from the brine zone by a cation-permeable anion-blocking membrane. The brine zone is separated from the desorption zone by an anion-permeable cation-blocking membrane. At the same time, a further ion stream, in addition to the displacement ion stream, is produced at the anode in the anode chamber and diffused into the brine zone adjacent to the desorption zone separated from the cation-permeable membrane. A cathode chamber with a cathode serves as the second electrode chamber, and is separated from this desorption zone by a cation-permeable anion-blocking membrane. A rinsing liquid flows in sequence first through the brine zone adjacent to the desorption zone, then through the cathode chamber adjacent to the desorption zone and then through the central brine zone common to the processes of absorption and desorption (displacement zones) of the pre-treatment.

Thus, the ionic salt components originating from the liquid being treated are washed out by desorption from the region of the post-treatment, and by ion displacement out of the region of the pre-treatment in the form of a single common brine.

To practice this process, a device is used consisting of at least one vessel with displacement chambers as well as a desorption chamber arranged therein for a liquid being treated in these chambers. These chambers are equipped with pipes for the supply and the discharge of the liquid, as well as for the supply and the discharge of a brine to be removed from this device.

According to the invention, this device is characterized in that the displacement chambers and the desorption chamber for the liquid to be treated are formed by ion-exchange membranes as boundary layers. The displacement chambers are filled with an ion-exchange mass each, and the desorption chamber is filled with at least two layers of exchange masses. Each ion-exchange membrane is permeable to certain ions, but impermeable to oppositely-charged ions as well as to the liquid. Cathode chambers are provided for the cathodes next to the displacement chambers and to the desorption chamber.

An anode chamber is provided for an anode inserted next to the displacement chambers as well as the desorption chamber. One of the cathode chambers is adjacent to a displacement chamber filled with an anion-exchange mass and the other cathode chamber is adjacent to a desorption chamber filled with layers of cation- and anion-exchange masses. On one side, the anode chamber is adjacent to the displacement chamber being filled with a cation-exchange mass. To the other side, the anode chamber forms with the desorption chamber a brine chamber.

These chambers are connected with each other in a selective ion-permeable way by ion-exchange membranes designed as selective barrier layers. Cation-permeable ion-exchange membranes are provided for the displacement chamber containing the cation-exchange mass, and anion-permeable ion-exchange membranes are provided for the displacement chamber containing the anion-exchange mass. A cation-permeable ion-exchange membrane and an anion-permeable ion-exchange membrane are provided to separate the desorption chamber from the cathode and the brine chambers, respectively. The anode chamber is formed on both sides by cation-permeable ion-exchange membranes. The brine chamber adjacent to the desorption chamber is connected to the cathode chamber adjacent to the desorption chamber by at least one pipe. This cathode chamber is connected by at least one pipe to the brine chamber provided between the cation and anion displacement chambers.

Through absorptive and desorptive displacement, a large portion of the ionic salts in the liquid are transferred into a brine chamber being demineralized by ion streams originating from the electrodes and migrating in a diagonal stream within the electric field. By desorption, the residual ionic components of the fluid being demineralized in the desorption chamber filled with layers of cation- and anionexchange masses are transferred into an adjacent brine chamber and a cathode chamber by means of a potential. The thus concentrated brine is transfered sequentially there through.

In addition, the present invention also provides a number of advantages in terms of energy and cost with respect to process engineering and apparatus designing. These advantages are in particular:

(a) The introduction of the liquid containing salts which has to be demineralized into the displacement chambers and the migration of ion streams from the electrodes in the electrode chambers into the liquid being treated result in a low electric resistance for the migrating ionic salt components. Therefore, an especially low electric potential suffices for the transport of the largest amount of the salts. The efficiency of the current, or the transformation of an electric equivalent into a chemical one, remains high because the amount of the displacement ion streams is adjusted to only attain partial demineralization. The advantage resulting from these two measures is that the consumption of energy, for which the electric potential and the intensity of the current are important factors (as is already known), to eliminate the largest amount of salts from the liquid being demineralized (e.g. 95%) remains especially low.

(b) The introduction of the liquid containing the residual amount of salts into a desorption chamber causes (by means of an electric potential) an almost complete removal of the residual content of salts and therefore produces a liquid having a high degree of purity.

(c) An advantage of the process according to the invention is that by layering cation- and anion-exchange masses in the desorption chamber, both the cationic and the anionic salt components of the liquid being demineralized can move without being hindered even at a low electric potential. Hence, the result is a very low consumption of energy even in the case of an extremetly satisfactory purification effect.

(d) A further advantage of the invention is that the concentrated amounts of brine originating from the desorption chamber are transferred to the brine chamber between the displacement chambers and there they lower the electric resistance, thereby lowering the energy consumption for the removal of the largest portion of salts from the liquid being demineralized.

A special advantage of the process according to the invention is the passage of a single brine stream to receive both the residual amount of salts originating from the desorption chamber and the main amount of salts originating from the displacement chambers. This advantage is effective in many respects:

The amount of waste water is very low in relation to the amount of salts eliminated or the amount of product obtained. As a result, the stream of waste water to the drainage and the consumption of raw water, (e.g., in the case of water treatment) are lower than in other known processes.

Since the amount of waste water is small, the loss of heat of the whole system is low with respect to the recovery of heat from the waste water. The use of a single waste water stream simplifies the control and adjustment of the salt discharge of the whole system and its operation, and the construction of the apparatus becomes considerably less expensive.

(f) Through the unhindered movement of the ions migrating from the anode into the brine chamber adjacent to the desorption chamber and the direct movement of the desorbing cationic salt components out of the desorption chamber and into the adjacent cathode chamber, the electric resistance is considerably lowered at the stage of desorption, as is the necessary driving electric potential and finally the consumption of energy.

(g) A further advantage of the process according to the invention is represented by the arrangement of a brine chamber between a desorption chamber and an anode chamber, thereby preventing the discharge of volatile anionic salt components at the anode, and therefore the occurrance of corrosive and toxic effects.

(h) An advantage, especially for the construction of the apparatus, is that both the cross stream of the displacement ions produced for the demineralization in the cationic displacement chamber, and the potential for eliminating the residual content of salts are produced by one and the same anode. This leads to a clear cost reduction for the production of the device of the invention.

Figure 2:
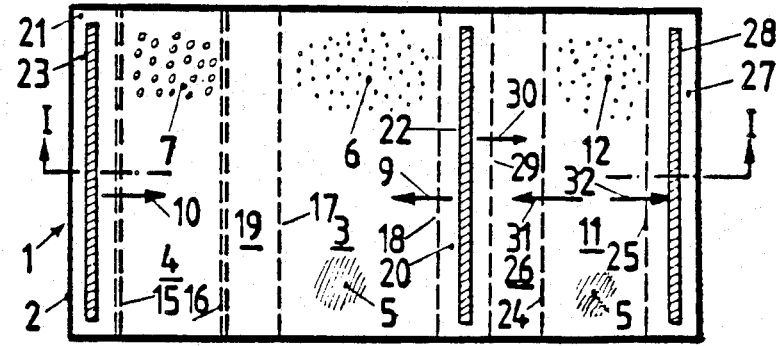

Further advantageous developments of the invention in regard to the production and the specific device can be read particularly in view of the following Figures. In the drawings, some examples of the design of the invention are illustrated schematically without the scope of the invention being restricted thereto. These are:

FIG. 1 shows a longitudinal mid-section through a device according to the invention in plane I—I in FIG. 2. Shown are two displacement chambers with a brine chamber lying therebetween, a desorption chamber with its corresponding brine chamber as well as a joint anode chamber adjacent to the displacement chamber and to the desorption chamber and a cathode chamber adjacent to each, arranged in one vessel.

FIG. 2 shows a cross-section through the device in plane II—II in FIG. 1.

The device 1 according to the invention is built in accordance with the description of FIGS. 1 and 2. It consists of a vessel 2 for displacement chambers 3 and 4 provided therein. In the latter chambers, processes of absorption and desorption occur between a liquid being treated, ion-exchange masses 6, 7 and ion streams 9, 10 coming from the electrodes 8. In addition, the process of desorption of the liquid being treated takes place in the ion-exchange masses 12, 13 in a potential field formed between electrode 14 and one of the electrodes 8.

The displacement chambers 3 and 4, of which at least one displacement chamber 3 is provided in vessel 2 for the flow of cations 9, and a further displacement chamber 4 is provided for the flow of the anions 10, are each filled with an ion-exchange mass 6, 7 and a fluid 5 being treated is successively passed there through. The displacement chambers 3, 4, which are bordered by boundary layers in the form of ion-exchange membranes 15 to 18, are in an arrangement of one displacement chamber each, (e.g., chamber 3 for cations 9, and chamber 4, for anions 10) between a joint brine chamber 19 and the respective electrode chamber 20, 21. More specifically, the displacement chamber 3 for the cations 9 borders the electrode chamber 20 for the anode 22, and the displacement chamber 4 for the anions 10 borders the electrode chamber 21 of the cathode 23. The ion-exchange membranes 15 to 18 between these chambers 3, 4 and 20, 21 are designed in such a way, that they each let through the ion streams 9, 10 into the respective displacement chambers 3, 4, and therefrom into the brine chamber 19. These membranes, however, block the passage of a liquid 5 as well as the passage of oppositely-charged ions. In this arrangement, the hydrogen ions produced by the anode 22 in the anode chamber 20 are transported into the displacement chamber 3 for the cations 9. The hydroxyl ions produced by the cathode 23 in the cathode chamber 21 are transported to the ion stream 10 in the displacement chamber 4 for anions.

The desorption chamber 11, at least one being arranged in vessel 2 is filled with ion-exchange masses 12, 13 in the form of layers, through which layers the fluid 5 to be treated is successively passed. The desorption chamber 11, which is bordered on both sides by boundary layers in the form of ion-exchange membranes 24, 25, is arranged between a brine chamber 26 and a cathode chamber 27 for the cathode 28. The anode chamber 20 for the anode 22 is joined to the brine chamber 26 by a boundary layer in the form of an ion-exchange membrane 29. The ion-exchange membranes 24, 25, 29 between the chambers 20, 26, 11 and 27 are designed in such a way that they let each pass ion streams 30, 31 respectively into the brine chamber 26 and the ion stream 32 into the cathode chamber 27, but block the passage of liquids (e.g., liquid 5), as well as the passage of oppositely-charged ions. In this arrangement the cations 30 are the hydrogen ions produced at the anode 22 in the anode chamber 20, the anions migrating from the desorption chamber 11 into the brine chamber 26 are depicted as the ion stream 31. The cations migrating from the desorption chamber 11 into the cathode chamber 27 are depicted as the ion stream 32.

The device 1 is conceived in a way that a supply pipe 33 for the liquid 5 being treated enters into the displacement chamber 3 for the cations 9 (e.g., at the top). This chamber is connected with a discharge pipe attached to said displacement chamber at the bottom, and a connection 20 by a boundary layer in form of an ion-exchange membrane 29. The ion pipe 34 is connected, e.g., at the bottom, to the displacement chamber 4 for anions 10. At the top end of this displacement chamber 4 for anions 10 a discharge pipe 35 is attached, through which the liquid 5 being treated in the displacement chambers 3, 4 is passed (e.g., the supply pipe 36 arranged on top into the desorption chamber 11) for further treatment. At the bottom end of this desorption chamber 11 is attached a product pipe 37 through which the treated liquid 5 can be collected. The brine chamber 26 is separated by ion-exchange membranes 24, 29 from the desorption chamber 11 on one side, and from the anode chamber 20 on the other. This chamber 26 is equipped with a discharge pipe 39 and a supply pipe 38 which is attached to the product pipe 37 for the treated liquid for the purpose of introducing a transporting fluid into brine chamber 26 by means of a connecting pipe 40. The discharge pipe 39 is attached to the supply pipe 42 of the cathode chamber 27 by means of the connection pipe 41 allowing for the transfer of the transporting liquid discharged from the brine chamber 26 into the cathode chamber 27.

At the bottom end of the cathode chamber 27, there is a drainage pipe 43 which is attached by means of a connecting pipe 44 to the supply 45 of the brine chamber 19 for the purpose of introducing the transporting liquid discharged from the cathode chamber 27. The brine chamber 19 being separated at the sides by the ion-exchange membranes 16, 17 bound on one side by the displacement chambers 3 for cations 9, and on the other side by the displacement chamber 4 for anions 10. The brine chamber 19 is equipped with a discharge pipe 46 which is connected with a brine discharge not shown in the drawing.

The electrodes 22, 23, 28 entering the electrode chambers 20, 21, 27 are connected to an electric power supply 47 of a direct current source by the connection of at least one control and measurement system 48. Electrolytic gases formed at the electrodes 22, 23, 28 are let our of the device 1 by a degassifier 49.

The treatment of liquid 5, or the demineralization of the raw water, is carried out by a pre- and post-treatment according to the process described in the invention. Each of the treatments takes place in several steps. In the anode chamber 20 of the device according to FIGS. 1 and FIG. 2, dilute sulfuric acid, which is a non-consuming medium, allows the formation of hydrogen ions at the anode 22. This corresponds to a direct current voltage applied at the electrodes 22, 23 and at the electrodes 22, 28 and to the respective electrical resistance between the electrodes.

Electric currents flow from the ampere meter (ammeters) of a control and measuring circuit 48 through the fluid 5 which are applied, between the electrodes 22, 23 of the pre-treatment and between the electrodes 22, 28 in the post-treatment. A hydrogen ion stream 9 coming from the anode chamber 20, equivalent to the electric current between the electrodes 22, 23, moves within the displacement chamber 3 in the direction of the brine chamber 19. In doing so, it crosses the stream of the liquid 5 and the ionic salt components contained in the liquid 5 being from top to bottom through the exchange mass 6 of the displacement chamber 3. The processes of absorption and desorption occur after balances are attained between the concentration of the ions in the aqueous phase and in the exchange phase. The movement of all ions in the liquid stream occurs vertically, and the electric potential acts horizontally as the driving difference. In the course of this movement, the cationic salt components of the liquid 5 being treated are removed by the hydrogen ions of the ion stream 9 in the direction of the brine cell 19, and are the new partners of the anionic salt components of the fluid 5 being treated. The quantity of hydrogen ion stream 9 is regulated by varying the electric potential delivered to the electrodes 22, 23 in such a way that not all (preferably only 90 to 95% of all) cationic salt components are removed. This maintains a surplus of hydrogen ions 9 as well as an equivalent low amount of electric current to be spent between the electrodes 22, 23, and which maintains a high degree of current efficiency. The same effect is achieved if the quantity of flow of the fluid 5 being treated is varied instead of the electric potential of the electrodes 22, 23.

The liquid 5 leaving the displacement chamber 3 is freed to a large extent of its cationic salt components and is introduced into the displacement chamber 4 through the connecting pipe 34 where it is crossed by the ion stream 10. This ion stream 10 consists of hydroxyl ions which are formed at the cathode 23 in the cathode chamber 21 filled with dilute soda lye, and which is quantatively equivalent to the electric current between the electrodes 22, 23, and move in the displacement chamber 4 into the direction of the brine chamber 19. Processes of absorption and desorption are also started in the displacement chamber 4 which are analogous to the processes in the displacement chamber 3. These processes start in chamber 4 after balances are attained between the concentrations of the ions in the aqueous phase and in the anion-exchange phase 7. The movement of the ions in the liquid stream 5 occurs vertically as well, and the electric potential acts horizontally as a driving difference.

In the course of these processes, the anionic salt components of the liquid 5 being treated are removed by the hydroxyl ions of the ion stream 10 in the direction of the brine cell 19. The hydroxyl ions and the hydrogen ions which migrated into the liquid 5 in the displacement chamber 3, form water. The hydroxyl ion stream 10 is equivalent in amount to the electric current between the electrodes 22, 23, and as in the case of the cationic displacement results in the removal of only 90 to 95% of all anionic salt components from the liquid 5. This results in a high degree of current efficiency.

As the hydrogen ions 9 move more rapidly than the hydroxyl ions 10 their concentrations, and thus their effect on the displacement of the cationic salt components, are lower. According to the invention, this fact is compensated for by a longer residence time, i.e., by a thicker displacement chamber 3, compared to the anionic displacement chamber 4, as shown in FIG. 1 and FIG. 2.

It has further been proved that the blocking effect of the ion-exchange membranes is not complete. In practice there is permeability of counter ions of opposite charge, and up to approximately 2% of the ion concentration to be blocked passes through. This leads to the undesired migration of cations into the displacement chamber 4. According to the invention, therefore, this anionic displacement chamber 4 of the pre-treatment stage is bordered by thicker or double membranes 15, 16 as is shown in FIG. 1 and FIG. 2.

The liquid 5 is demineralized to the largest extent in the displacement chamber 4 and is then led into the desorption chamber 11 through the discharge pipe 35 and through the supply pipe 36 for the post-treatment. In accordance to a direct current voltage applied at the electrodes 22, 28 and in accordance to the electric resistance between these electrodes, an electric current and an equivalent ion stream 30 consisting of hydrogen ions are formed at the anode 22. The stream of hydrogen ions flows through the cation-permeable membrane 29 coming from the anode chamber 20, and passes into the brine chamber 26. Simultaneously, the residual anionic salt components of the liquid 5 migrate through the anion-exchange layers 13 through the exchange layers 12, 13 having very good electric conductivity, and then through the anion-permeable membrane 24 into the brine chamber 26. The residual cationic salt components migrate through the cation-exchange layers 12 having a good electric conductivity as well, and then through the cation-permeable membrane 25 into the cathode chamber 27.

The electric potential difference at the electrodes 22, 28 acts as the driving difference for the desorption and movement of both types of ions. During the flow of the liquid 5 being treated through the exchange layers 12, 13 arranged in several layers the processes described reoccur in each exchange layer. The residual cationic salt components are only desorbed by the cation exchange masses 12, and the anionic components are only desorbed by the anion-exchange masses 13, in an alternating manner. This results in an unblocked path of low electric resistance becoming available for ion movement and displacement.

The treated liquid 5 leaves the device 1 as a so-called product practically free of salts through the discharge pipe 37 of the desorption chamber 11. A partial stream of the treated liquid 5 is conducted through pipe 40 and through the supply 38 into the brine chamber 26 (and flows through this chamber from bottom to top) for the purpose of brine washing. The residual anionic salt components being desorbed out of the liquid 5 being treated flow through the desorption chamber 11, are combined with the hydrogen ions 30 of the brine chamber 26 (balancing them electrically), are washed out through the discharge 39 and are then directed through the connecting pipe 41 towards the cathode chamber 27. The hydroxyl ions formed at the cathode 28 by a direct current voltage being applied in a well known manner form water with the hydrogen ions 30 which are brought in with the rinsing liquid from the brine chamber 26 into the cathode chamber 27. At the same time, the residual anionic salt components being brought in by the same rinsing liquid are electrically compensated by the cationic stream 32 consisting of residual cationic salt components coming from the desorption chamber 11 and diffusing in through the cation-permeable membrane 25. The brine being formed in this way in the cathode chamber 27 is introduced into the brine chamber 19 for brine rinsing by means of a discharge pipe 43 of the cathode chamber 27, through the connecting pipe 44 and into the supply pipe 45. Therefore, the brine is more efficiently used as a rinsing liquid. In brine chamber 19, the rinsing liquid already containing the residual salt content from the liquid 5 of the post-treatment flows from bottom to top, and in so doing it absorbs the anionic and cationic salt components which are drawn out of the displacement chambers 3, 4 and are permeated into the brine chamber 19, further enriching its salt content. The brine, now enriched to a high degree, now leaves the device 1 through the discharge pipe 46 of the brine chamber 19, and arrives into a brine discharge not shown in the drawings. Material balance calculations according to the process of demineralization of the invention have shown that the reuse of the rinsing liquid results in an important increase of industrial efficiency.

I claim:

1. A process for demineralizing an aqueous liquid containing salts, comprising:

successively passing the liquid through alternating separate layers of at least one means for exchanging cations and at least one means for exchanging anions to obtain a substantially demineralized liquid, said means for exchanging cations containing labile hydrogen ions and said means for exchanging anions containing labile hydroxyl ions;

applying electric energy between an anode and a cathode across the direction of the flow of the liquid and through said layered means, whereby cations and anions disassociated from the salts are transferred in opposite directions out of said layers and toward the cathode and anode, respectively; and flushing said cations and said anions.

2. The process of claim 1 wherein said liquid passes successively and alternatingly first through one cationexchange means and then through one anion-exchange means.

3. The process of claim 1, wherein the applied electric energy is effective to attain a constant ionic current through said anode and cathode.

4. The process of claim 1 wherein the anions disassociated from the salts are transferred out of said layers into a flushing solution towards the anode.

5. The process of claim 4 further comprising:

passing the flushing solution containing the flushed anions adjacent to the cathode; and flushing said cations and said anions adjacent to said cathode.

6. The process of claim 1, wherein the starting aqueous liquid containing salts is a partially demineralized liquid.

7. The process of claim 4 wherein said anions are flushed with a portion of the substantially demineralized liquid as the flushing solution.

8. The process of claim 1 wherein said means for exchanging cations and said means for exchanging anions are cation-exchange and anion-exchange resins.

9. A process for demineralizing an aqueous liquid containing salts, comprising a displacement stage and a desorption stage;

said displacement stage comprising:

alternatingly passing the liquid through at least one means for exchanging cations and at least one means for exchanging anions to obtain a partially demineralized liquid, said cation-exchange means containing labile hydrogen ions and said anion-exchange means containing labile hydroxyl ions, whereby cations and anions disassociated from the salts are exchanged for the labile hydrogen ions and the labile hydroxyl ions;

applying electric energy between an anode and a cathode across the direction of flow of the liquid, whereby hydrogen ions and hydroxyl ions migrating in opposite directions are exchanged for the cations and anions in the means for exchanging ions, thereby restoring said labile hydrogen and hydroxyl ions to said ion-exchange means and allowing for the displaced cations and anions to migrate in opposite directions; and passing at least one first flushing solution across the direction of the electric current capable of receiving the cations migrating from said means for exchanging cations and the anions migrating from said means for exchanging anions, whereby salts are formed and discharged with said first flushing solution; and said desorption stage comprising:

successively passing the partially demineralized liquid from said displacement stage through alternating separate layers of at least one cation-exchange means and at least one anion-exchange means to obtain a substantially demineralized liquid;

applying electric energy between an anode and a cathode across the direction of flow of the liquid and through said layered means, whereby residual cations and anions disassociated from the salts are transferred in opposite directions out of said layers and toward the cathode and the anode, respectively; and flushing said cations and said anions.

10. The process of claim 9 wherein said liquid passes successively and alternatingly first through one cationexchange means and then through one anion-exchange means of said desorption stage.

11. The process of claim 9 wherein
the anions disassociated from the salts are transferred out of said layers and into a second flushing solution towards the second anode of said desorption stage; and
said anions are flushed.

12. The process of claim 11, further comprising:
passing the second flushing solution containing the flushed anions adjacent to said second cathode of said desorption stage; and
flushing said cations and said anions adjacent to said second cathode.

13. The process of claim 11, further comprising:
flushing said anions of said desorption stage with a portion of the substantially demineralized liquid of said desorption stage as the second flushing solution.

14. The process of claim 9, wherein the first flushing solution is brine.

15. The process of the claim 9 wherein the cationexchange means and the anion-exchange means are cation-exchange resins and anion-exchange resins.

16. The process of claim 9, wherein the migration of anions into said means for exchanging cations towards said anode means, and the migration of said cations into said means for exchanging anions towards said first cathode of said displacement stage is blocked.

17. The process of claim 9, wherein the electric energy applied between said cathode and said anode of said displacement stage, and between said cathode and said anode of said desorption stage is effective to attain a constant current through said displacement stage and said desorption stage.

18. The process of claim 9, wherein said aqueous liquid containing salts is successively passed first through one means for exchanging cations and then through one means for exchanging anions of said displacement stage.

19. The process of claim 12, further comprising passing said aqueous liquid through a second means for exchanging cations of said displacement stage.

20. The process of claim 9, wherein said first anode of said displacement stage and said anode of said desorption stage are one and the same or separate anodes.

21. The process of claim 9, wherein the cations displaced from said cation-exchange means and the anions displaced from said anion-exchange means are transferred to the first flushing solution of said displacement stage at about the same time.

22. The process of claim 9, wherein said first flushing solution of said displacement stage is the flushing solution flowing out of said second cathode of said desorption stage.

23. The process of claim 9, wherein the aqueous liquid containing salts is passed
first through a first cation-exchange means of said displacement stage;
then through a first anion-exchange means of said displacement stage;
then through a second cation-exchange means of said displacement stage; and
then successively through said alternating separate layers of said cation-exchange and said anion-exchange means of said desorption stage.

24. An apparatus for demineralizing an aqueous liquid containing salts, comprising:
at least one anode compartment with an anode therein;
at least one cathode compartment with a cathode therein;
at least one desorption compartment positioned between said anode and said cathode compartments; said desorption compartment containing alternating separate layers of at least one cation-exchange means and at least one anion-exchange means, each said ion-exchange means being adjacent to both said cathode and said anode compartments;
means for introducing and removing said aqueous liquid from said layered desorption compartment, wherein the liquid being removed is substantially demineralized;
means for selectively permeating anions separating from said layered desorption compartment toward said anode compartment and means for selectively permeating cations separating said desorption compartment toward said cathode compartment;
means for applying an electric potential between said anode and said cathode and across said layered desorption compartment, whereby cations and anions disassociated from the salts in said layered desorption compartment are transferred in opposite directions out of said layered desorption compartment and toward the cathode and the anode, respectively; and
means for flushing said cations and said anions.

25. The apparatus of claim 24, further comprising:
an anion flushing compartment positioned between said desorption compartment and said anode compartment;
means for introducing and removing a flushing liquid from said flushing compartment; and
means for selectively blocking anions separating from said layered desorption compartment from entering said anode compartment.

26. The apparatus of claim 24, wherein the means for selectively permeating ions is a membrane.

27. The apparatus of claim 25, wherein the means for selectively blocking anions is a cation permeable membrane.

28. The apparatus of claim 24, wherein the applied electric potential applied between said anode and said cathode is effective to attain a constant circulating current.

29. The apparatus of claim 24 further comprising means for transferring the flushing liquid from said anion flushing compartment into said cathode compartment.

30. The apparatus of claim 25 further comprising:
means for transferring a portion of the substantially demineralized liquid discharged from said desorption compartment into said anion flushing compartment.

31. An apparatus for demineralizing an aqueous liquid containing salts which includes a displacement stage and a desorption stage;
said displacement stage comprising:
at least one anode compartment with an anode therein;
at least one cathode compartment with a cathode therein;
at least one cation-exchange compartment containing a cation-exchange means therein;
at least one anion-exchange compartment containing an anion-exchange means therein;
at least one first flushing compartment positioned between said cation-exchange compartment and said anion-exchange compartment, all of said foregoing compartments separated from each other by means for selectively permeating ions;
means for introducing and removing the aqueous liquid from each of said cation-exchange and anion-exchange compartments, wherein said liquid is partially demineralized;
means for flushing said cations and said anions from said flushing compartment; and
means for applying an electric potential between said anode and said cathode and across said cation-exchange means, said anion-exchange means, and said flushing compartment, whereby cations and anions disassociated from the salts migrate in opposite directions toward said cathode and said anode, respectively; and
said desorption stage comprising:
at least one anode desorption compartment with an anode therein;
at least one cathode desorption compartment with a cathode therein;
at least one ion desorption compartment positioned between said anode and said cathode desorption compartments; said ion desorption compartment containing alternating separate layers of at least one cation-exchange means and at least one anion-exchange means, each said means being adjacent to said cathode and said anode desorption compartments;
means for introducing said partially demineralized liquid from said displacement stage into said layered desorption compartment and means for removing said liquid from said layered desorption compartment, said outflowing liquid being substantially demineralized;
means for selectively permeating anions separating said layered desorption compartment toward said anode desorption compartment and for selectively permeating cations separating said layered desorption compartment toward said cathode desorption compartment;
means for applying an electric potential between said second anode and said second cathode across said layered desorption compartment, whereby residual cations and anions disassociated from the salts in said layered desorption compartment are transferred in opposite directions out of said layered compartment and toward said second anode and said second cathode, respectively; and
means for flushing said cations and said anions from said desorption stage.

32. The apparatus of claim 31, wherein said cationexchange means is a cation-exchange resin; and
said anion-exchange means is an anion-exchange resin.

33. The apparatus of claim 31 wherein the desorption stage further comprises:
an anion flushing compartment positioned between said layered desorption compartment and said second anode compartment;
means for introducing and removing a second flushing liquid from said anion flushing compartment; and
means for selectively permeating anions separating said flushing compartment from said layered desorption compartment and said second anode compartment.--

34. The apparatus of claim 31 wherein said means for permeating ions is a membrane.

35. The apparatus of claim 33 wherein the means for selectively permeating anions separating said flushing compartment from said second anode of said desorption stage is a double anion-permeable membrane.

36. The apparatus of claim 31 wherein the electric potentials applied between said anode and said cathode of said displacement stage, and between said anode and said cathode of said desorption stage are effective to attain a constant current through said displacement stage and said desorption stage.

37. The apparatus of claim 33 wherein the desorption stage further comprises means for transferring said second flushing liquid from said anion flushing compartment of said desorption stage into said second cathode compartment of said desorption stage.

38. The apparatus of claim 33, wherein said desorption stage further comprises means for transferring a portion of the substantially demineralized liquid discharged from said layered desorption compartment into said flushing compartment of said desorption stage.

39. The apparatus of claim 31, wherein said first anode of said displacement stage and said second anode of said desorption stage are one and the same.

40. The apparatus of claim 33, further comprising:
means for transferring aqueous liquid from said cation-exchange compartment of said displacement stage into said anion-exchange compartment of said displacement stage; and
means for transferring the partially demineralized aqueous liquid flowing out of said anion-exchange compartment of said displacement stage into said layered desorption compartment of said desorption stage.

41. The apparatus of claim 33, further comprising:

means for transferring the partially demineralized liquid from said displacement stage into said second anode of said desorption stage.

42. The apparatus of claim 31, wherein the aqueous liquid being demineralized is successively passed:
first through said cation-exchange means of said displacement stage, and then through said anion-exchange means of said displacement stage; and
thereafter through said layered desorption compartment of said desorption stage.

43. The apparatus of claim 31, wherein said means for selectively permeating ions which separate said anion-exchange means from said first flushing chamber and said first cathode of said displacement stage are anion-permeable membranes; and
said means for selectively permeating ions separating said first cation-exchange means from said first flushing chamber and said first anode of said displacement stage are cation-permeable membranes.

44. The apparatus of claim 31, wherein the anionexchange membranes separating said anion-exchange compartment from said first flushing chamber and said first cathode of said displacement stage are double anion-exchange membranes.

45. The apparatus of claim 31, wherein
said displacement stage contains first and second cation-exchange compartments and one anion-exchange compartment; and further comprises:
a means for attaining about the same displacement time for the cations and anions migrating from the electrodes into the first flushing chamber of said displacement stage.

46. The apparatus of claim 33 further comprising:
means for transferring a flushing liquid flowing out of said second cathode of said desorption stage into said first flushing compartment of said displacement stage.

* * * * *